United States Patent [19]

Cathey et al.

[11] Patent Number: 5,778,182
[45] Date of Patent: Jul. 7, 1998

[54] USAGE MANAGEMENT SYSTEM

[75] Inventors: Deborah Ann Cathey, Jersey City, N.J.; William Chau, New York, N.Y.; Krishna Ramachandran Mathis, Edison, N.J.; Paul Nema, Long Island City, N.Y.; Jonathan Yang, Bridgewater, N.J.

[73] Assignee: AT&T Corp., Middletown, N.J.

[21] Appl. No.: 553,117

[22] Filed: Nov. 7, 1995

[51] Int. Cl.$^6$ .................................................. H04N 7/173
[52] U.S. Cl. ........................ 395/200.49; 348/1; 455/2
[58] Field of Search .................... 395/200.09, 200.47, 395/200.48, 200.49; 348/1, 2, 3, 4, 5, 6, 7, 10, 11, 12, 13; 455/2, 4.2, 5.1, 6.1, 6.2, 6.3; 364/550; H04N 7/16, 7/173

[56] References Cited

U.S. PATENT DOCUMENTS 5,289,271 2/1994 Watson .................................. 455/2
5,659,350 8/1997 Hendricks et al. ................. 455/4.2

*Primary Examiner*—Chris Grant

[57] ABSTRACT

A usage management system for tracking usage of applications available to subscribers of an interactive network includes an application server adapted to process a plurality of applications on demand by the users. The application server generates a plurality of event records each event record including at least one active domain identifier representing a domain being executed. Each domain represents an executable logical location within an application. A usage processing server is coupled to the application server, which is adapted to receive signals from the application server corresponding to the generated event records. The usage processing server is further adapted to track the time of occurrence of each domain identified in each event record.

22 Claims, 7 Drawing Sheets

USAGE MANAGEMENT SYSTEM

FIELD OF THE INVENTION

This invention relates to a usage management system that tracks usage information in an interactive television or computer network environment.

BACKGROUND OF THE INVENTION

In an interactive television system environment, subscribers communicate back and forth with information providers who transmit various programs based on subscribers' demands. A subscriber may transmit information or commands back to the transmitter. This information or commands, from the subscriber, may in turn affect the subsequent programs or information directed to the subscriber. Some of the applications offered by interactive television systems include video games, video catalog shopping, teaching and educational programs, movies on demand and audio programs. Each application may be tailored for an individual subscriber. Furthermore, each application may be provided by a plurality of application vendors. Such applications are also known as "contents" or "titles" and the application vendors are known as "content" or "title" providers.

An important objective of title providers is the ability to track the behavior of the subscribers when they use the interactive television system. There are some consumer rating systems that monitor viewer's responses in traditional television or radio systems. For example, television has Nielson ratings, which tell how many television sets are tuned in, while a program is broadcasting. However, currently there are no rating systems that can monitor and track the usage of various titles available in an interactive television system.

SUMMARY OF THE INVENTION

In accordance with one aspect of the invention a usage management system for tracking usage of applications available to subscribers of an interactive network, comprises: an application server adapted to process a plurality of applications on demand by the users, the application server generating a plurality of event records each event record comprising at least one active domain identifier representing a domain being executed, wherein each domain represents an executable logical location within an application; a usage processing server coupled to the application server, the usage processing server adapted to receive signals from the application server corresponding to the generated event records, the usage processing server further adapted to track the time of occurrence of each domain identified in each event record.

In accordance with another aspect of the invention, a method for tracking usage activities for applications available to subscribers of an interactive network, comprises the steps of: receiving a plurality of event records generated in response to the usage activities of the users of an interactive television system each event record comprising at least a domain identifier associated with an active domain, the domain representing an executable logical location within the application; tracking the time of occurrence of each one of the active domains; storing data corresponding to the identity of the active domain and corresponding time of occurrence.

These and other aspects of the invention will become apparent from the attached drawings and detailed descriptions.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

FIG. 3b is a flowchart illustrating the operation of the online teleprocessing gateway illustrated in FIG. 3a.

DETAILED DESCRIPTION OF THE DRAWINGS

The invention is described in the context of an interactive television system in which an interactive television server communicates with set top boxes at subscribers' locations. However, it will be clear to those skilled in the art that the invention is not limited in scope to an interactive television system environment, and can be used in other interactive signal distribution systems in which a server interactively communicates with remote terminals. For example, one such signal distribution system consists of a plurality of terminals connected to a modem pool acting as a gateway to Internet.

Figure 1:
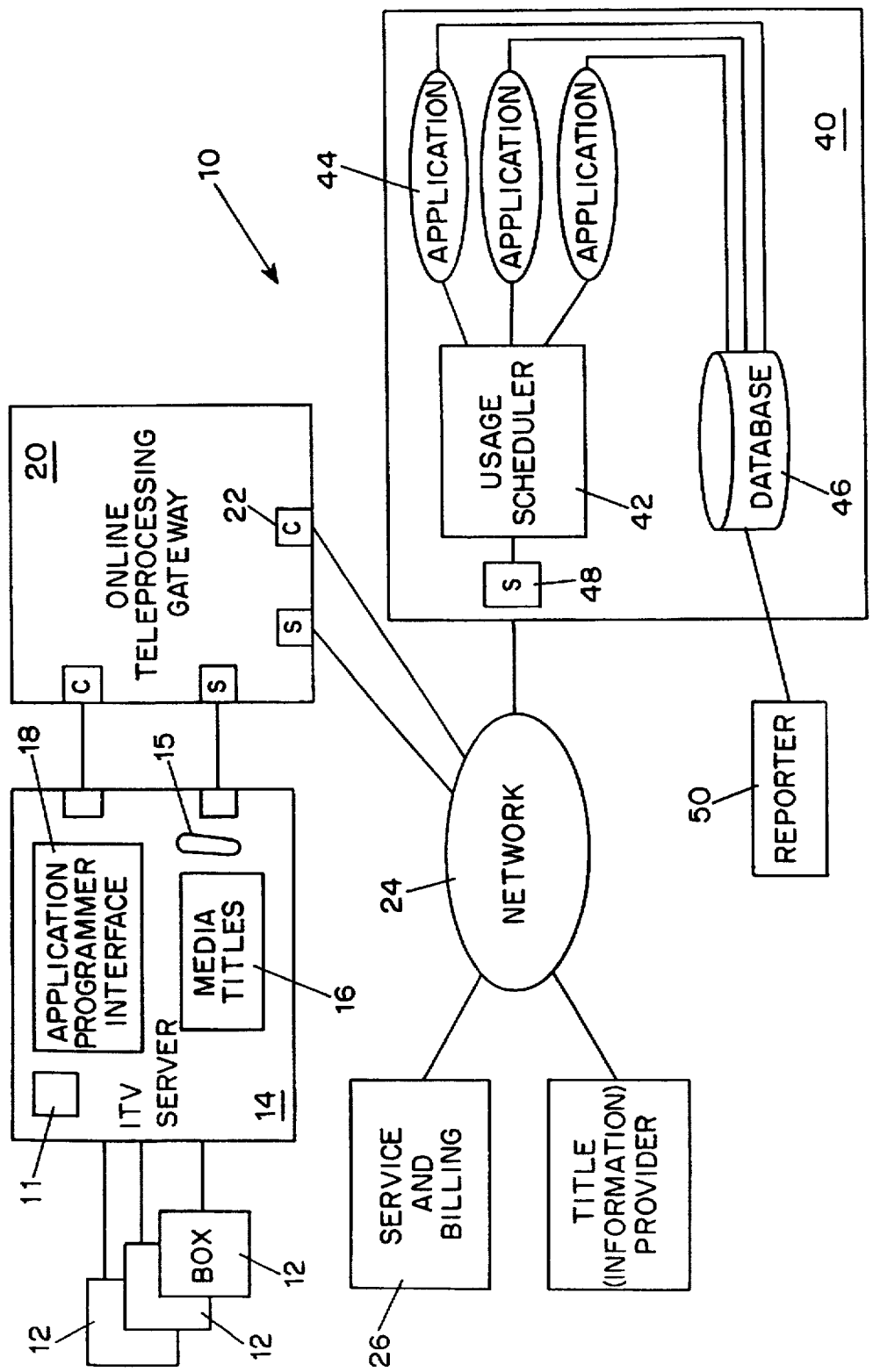
FIG. 1 illustrates a block diagram of an embodiment of a usage management system in accordance with the invention.

A block diagram of an embodiment of a usage management system 10 in accordance with the present invention is illustrated in FIG. 1. Usage management system 10 includes a plurality of set top boxes 12 coupled to an interactive television ("ITV") server 14. In one embodiment of the invention, interactive television server 14 comprises a server complex, wherein several servers interact to provide interactive services to subscribers. Interactive server 14 may be a SPARC processor, which includes four different processors. The operation of SPARC processors are well-known and described in, for example, in several manual released by Sun Microsystems, Mountainview, Calif., incorporated herein by reference. Interactive television server 14 is typically located at the front end of a transmitter, such as a cable operator. It includes a control server 11, which supervises the activities of server 14, and interfaces with usage management system 40 as will be explained in more detail hereinafter. Another server included in interactive television server 14 is a title or media server 16 which is configured to transmit desired applications or titles in response to demands made by the subscribers. Title server 16 functions as a communication manager and operates in conjunction with a database server 15, such as a Sybase database server. The operation of Sybase database server is well-known and described in *What's New In Sybase SQL Sever Release* 10.0, by Sybase, Inc. Emeryville, Calif. (Feb. 1, 1994), incorporated herein by reference. In response to a subscriber's demand, title or media server 16 retrieves from database management server 15, a copy of the title or application demanded by the subscriber. Title or media server 16 then executes the retrieved copy of the demanded title or application and transmits the outcome to the subscriber's set top box.

Interactive television server 14 also includes an application programmer's interface 18 that generates records that contain information about specific actions or events that the usage management system 10 intends to track and store. In the present context, each event, as will be explained in more detail hereinafter, represents a group of predefined actions that are generated by a title, in response to a demand made by a subscriber. Events are predefined by the title developers and users of the management system 10. Each of these events may include a plurality of domains that are being executed concurrently. Each domain defines at least one logical location in a title or an application whose contents may be provided to a subscriber. A logical location in a title may be the source of certain information or data being provided to a subscriber at a specific time. For example, this source of information may be a memory device or a file containing data related to items offered for sale in an interactive shopping session with a consumer. Another source of information may be the data corresponding to a prerecorded movie furnished by a title provider. The information model for tracking subscriber usage according to one embodiment of invention is based on usage of these logical locations or domains within a title. Thus each event record generated by application programmer's interface contains information relating to one or more of these domains or logical locations. For example, when a subscriber accesses a desired title, the system generates an event record that contains domain data representing that title. This domain data is referred to as the title domain for the selected title. When the consumer accesses another location within that title, the system generates another event record that contains domain data indicating the usage of this other location. The usage management system 10, tracks the usage of each domain within consecutive event records.

The records generated by the application programmer's interface 18 have a predefined format. Application programmer's interface 18 allows the title providers to develop their titles, without knowing the exact format of event records that each title needs to generate. Application programmer's interface 18 generates records based on a standardized format, relieving the application or title software from the task of formatting these records. However, it can be appreciated that the title providers may develop applications that can generate event records according to a predefined format, and therefore, the invention is not limited in scope to a system including an application programmer's interface.

The output signals generated by interactive television server 14 are coupled to an on-line teleprocessing gateway 20, which functions as a gateway, for interactive television transactions, to entities external to interactive television server 14. These transactions may be any application level data set or record that is to be transmitted from or received by the interactive television server 14. The on-line teleprocessing gateway 20 uses common industry communication standards to ensure data integrity. For example, in one embodiment of the invention, as illustrated in FIG. 1, gateway 20 employs a communication protocol known as transmission control protocol/internet protocol (TCP/IP) via TCP/IP standard sockets to send and receive information to the outside world. The operation of sockets in accordance with TCP/IP standard are well-known and described in *Unix*

*System V Network Programming* by Stephen A. Rego (Addison Wesley, 1993), incorporated herein by reference. Gateway 20 communicates with interactive television server 14 via an Ethernet network.

On-line teleprocessing gateway 20 uses a TCP client socket 22 to transmit information to a usage processing system 40 via a communication network 24. Communication network 24 provides access to the system by other remotely located administration servers. For example, subscriber service and billing server 26 is coupled to on-line teleprocessing gateway 20 to process a variety of administrative services. These services include channel mapping commands, intended for use by interactive television server 14, so as to provide the allocation of available channels to the subscribers. Other services include billing verification and subscription termination commands, when service to a subscriber terminates.

Usage processing system 40 uses a TCP server socket 48 to receive the usage event records from on-line teleprocessing gateway 20. The usage processing system includes a usage scheduler 42 to transport usage event records from TCP server 48 to usage application servers 44. In one embodiment of the invention, a plurality of usage application servers 44 run at the same time to accommodate the incoming usage event records.

Usage application servers 44 interface with usage scheduler 42 to receive the usage event records generated by interactive television server 14 via online teleprocessing gateway 20. As will be explained in more detail hereinafter, with reference to FIG. 7, each usage application server 44 calculates the aggregate time of various interactive television usage domains spanning over a consecutive sequence of event records. Usage processing system 40 then records, in the usage processing database storage 46, each occurrence of a usage domain and the corresponding time period that the usage domain remained active. As mentioned earlier, usage domain is defined by each interactive television title as a specific logical area within the title for which title providers want to track usage. A domain may be a specific title, segment, activity or frame. Domains may also be defined to include groups of titles, such as shopping, or the whole interactive television session.

Usage processing system 40 also includes a usage reporter that analyzes the data stored in database storage 46 and generates various usage reports. The report formats support the overall requirement for tracking subscriber usage and subscriber's navigational paths across the various titles. For example, certain reports depict usage by the number of times a particular interactive television title is accessed. Based on the usage occurrences and subscriber navigation information, title providers can track subscribers' usage behavior over a period of time. The operation of each one of the components of the usage management system 10 is described in more detail hereinafter.

Figure 2:
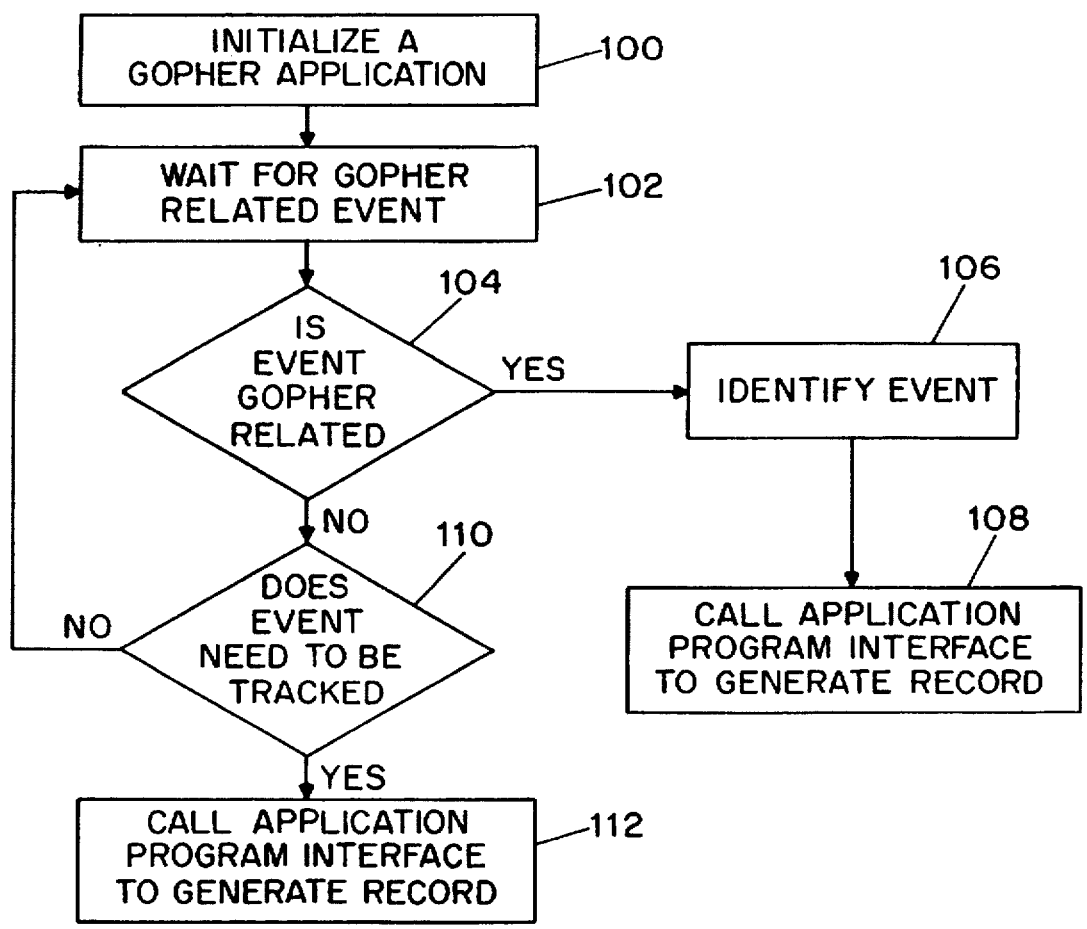
FIG. 2 illustrates the process for monitoring subscriber related activities that lead to generation of usage event records.

FIG. 2 illustrates the process for monitoring subscriber related activities that lead to the generation of usage event records. The interactive television server 14, includes two types of applications known as the gopher application and all other title applications. The gopher application, which is a supervisor process to all title applications, is aware when viewers turn "on" and "off" their set top box, change channels, identify themselves or attempt to validate their password. All usage events related to these activities are processed by the gopher application. All other usage related events are processed by the title applications.

As illustrated in FIG. 2, interactive television server 14 initializes the gopher application at step 100. The system at step 102 waits for a signal form set top box 12 of FIG. 1, indicating an activity intended to be processed by the gopher application. At step 104, if gopher application receives such a signal, the system identifies the corresponding event at step 106. Thereafter, the system goes to step 108 to call the application programmer's interface to generate an event record corresponding to the identified event. In the alternative, if at step 104, gopher application receives a signal not related to a gopher activity, the system goes to step 110 to determine whether the signal received from the set top box corresponds to a title event that needs to be tracked. If not, the system goes back to step 102 and monitors the signals generated by the set-top box 12 of FIG. 1.

If, however, an event to he tracked is identified at step 112, the title application calls the application programmer's interface to generate an event record corresponding to the identified event. The title application sends function calls to the application programmer's interface to populate an event record with the data corresponding to logical locations or domains within the title that are being used by a particular subscriber.

Each event record according to one embodiment of the invention contains three data portions. The first portion is referred to as the Standard Record Elements. The second portion contains the event specific domains. The third portion contains the event specific data.

The Standard Record Elements portion contains all the housekeeping information about the subscriber and the time the event has been generated. More specifically the Standard Record Elements portion contains the following data elements:

1. AccountNo.: This element identifies the subscriber's account, which serves as a billing reference for a group of people at the same address;
2. OutletNo.: This element identifies an installation of a cable or set top box within a household. There may be several set top boxes within a household, each being used by a different user;
3. Dttm: This element refers to the date and the time when a specific event took place.
4. TitleDomain: This element refers to the specific title or application from which an event record is being generated.
5. NumberOfUsageDomains: This element refers to the number of usage domains that are present within the event record.
6. ConsumerId: This element is a unique identifier for a user of the set top box. This allows the system to track a plurality of users within the same household.
7. EventType: This element refers to the classification of actions or occurrences that take place while a consumer is utilizing a set top box.
8. PlaceId: This element is a unique identifier for a place within a domain. A place is a logical area or a location in an interactive television title or application at a specific instant of time. This element is used to track the navigation of a consumer during a television session.
9. EntryMethod: This element is a code, which describes the method a subscriber chose to enter a logical place. For example "0" means that the consumer changed channel by entering channel number on the remote control. "1" means that the subscriber chose a menu option with a control mouse device coupled to the set top box. "2" means that the subscriber chose menu option with a remote keypad.

When application programmer's interface 18 receives a function call from a title or application, it populates an event record with the corresponding data elements in order to generate an event record. In addition application programmer's interface 18 populates the event record with standard record elements (SRE) described above. Tables 1–5 illustrate examples of function calls that a title application sends to application programmer's interface 18 to populate corresponding data elements in an event record. Each event is defined by a plurality of data elements associated with that event. Each event record and its corresponding data elements is considered in the system as an information object. Each event record contains information for those domains used by a subscriber.

TABLE 1

Sign-On Event

| Data Element | Function Call |
| --- | --- |
| Domain ID | AddDomain( ) |
| Title Domain ID | SetTitleDomain( ) |
| Consumer ID | SetConsumerId( ) |
| Place ID | SetPlaceId( ) |
| Entry Method Code | SetEntryMethodCd( ) |

For a Sign-On event, the AddDomain( ) function in table 1 is executed by the gopher application. This function allows the addition of one or more domains that are desired to be tracked. The SetTitleDomain( ) sets the domain id representing the title or channel the subscriber is currently tuned. Typically, this function is part of a start up routine of a title. The SetConsumer ID( ) function is used to identify a subscriber. This function begins at the start of a title or at any time subscribers choose to identify themselves. The SetPlaceId( ) function sets the specific title-defined place that a Subscriber is currently located within a domain. This function is used to track navigation within a title or between channels. Finally, the SetEntryMethodCd( ) function sets the entry method used by the subscriber as mentioned before This function is used to track navigational related data.

Table 2 illustrates the data elements and function calls related to the Sign Off Event. This event is recorded when a subscriber powers off the set top box. In one embodiment of the invention the Sign Off Event uses the same function calls as the Sign On Event.

TABLE 2

Sign Off Event

| Date Element | Function Call |
| --- | --- |
| Domain ID | AddDomain( ) |
| Title Domain ID | SetTitleDomain( ) |
| Consumer ID | SetConsumerId( ) |
| Place ID | SetPlaceId( ) |
| Entry Method Code | SetEntryMethodCd( ) |

Therefore, once the subscriber signs off the system, the gopher application receives a signal indicating that a subscriber is signing off. It then generates the Sign Off Event record by executing the functions illustrated in table 2.

Table 3 illustrates the data elements and the corresponding function calls for generating a Usage Event record. The Usage Event record contains information relating to subscriber's usage of a particular domain in a title.

TABLE 3

Usage Event

| Data Element | Function Call |
|---|---|
| Domain ID | AddDomain( ) |
| Title Domain ID | SetTitleDomain( ) |
| Consumer ID | SetConsumer Id( ) |
| Place ID | SetPlaceId( ) |
| Entry Method Code | SetEntryMethodCd( ) |

The usage event record tracks one or more domains within a title that need to be tracked. For example, one usage domain may be defined as a menu page of a home shopping title. Another usage domain may be one of the categories available from the menu page of the home shopping title. A further usage domain may be a list of discounted items within that category. As a result, a first usage event may be defined by the menu page domain. A second usage event may be defined by a combination of menu page and category domains. Yet a third usage event may be defined by a combination of category domain and list of discounted items domain. It is thus possible in accordance with one embodiment of the invention, to track usage events based on monitored domains. Conversely, it is also possible in accordance with another embodiment of the invention to track an active domain that may be present in a plurality of consecutive events. For the example of usage events mentioned above, the category domain remains active in the second and third usage events. Thus, it is possible to track the duration of an active domain that spans consecutive events.

Table 4 illustrates the data elements and function calls relating to the Consumer Identification Event. This event is recorded when a subscriber needs to be identified. The data elements and function calls to generate this event is the same as those illustrated in tables 1–3.

TABLE 4

Consumer Identification Event

| Data Element | Function Call |
|---|---|
| Usage Domain | AddDomain( ) |
| Title Domain | SetTitleDomain( ) |
| Consumer ID | SetConsumerId( ) |
| PlaceID | SetPlaceId( ) |
| Entry Method Code | SetEntryMethodCd( ) |

According to one embodiment of the invention, the system generates other event records. For example, the system generates a View Feature Event record that relates to certain situations where a consumer invokes a special effect or function while viewing a video clip. Such special effects or functions may include fast forwarding, rewinding or pausing the video clip. For a View Feature Event (not shown), the system generates event specific data elements in addition to those illustrated in tables 1–4. These data elements are "View Id" and "Feature." The ViewId element identifies the function or special effects that are utilized by the subscribers while viewing a video clip. For example, the value FF refers to fast forward; RR refers to rewind; PA refers to pause; FS refers to a partial screen; PS refers to a partial screen; VA refers to the viewing angle. The Feature element identifies the domain that relates to a specific promotion, movie or product-related video clip the subscriber is viewing.

Another event record that the system generates is New Or Change Order Event. This record relates to a situation where a subscriber places an order or modifies an order for a product or service. Table 5 illustrates the data elements and function calls corresponding to this event record.

TABLE 5

New Or Change Order Event

| Data Element | Function Call |
|---|---|
| Usage Domain | AddDomain( ) |
| Title Domain | SetTitleDomain( ) |
| Consumer ID | SetConsumerId( ) |
| Place ID | SetPlaceId( ) |
| Entry Method Code | SetEntryMethodCode( ) |
| Payment Method | |
| Number of Items Ordered | |
| Total Tax Amount | |
| Total Amount | |
| Number of Points Gained/Used | |
| Name of Person Shipped To | |
| Information Provider ID | AddProduct( ) |
| Product Number | |
| Quantity | |
| Price | |

The AddProduct( ) function is used whenever a product or service has been purchased. This function allows many products to be recorded within a single transaction.

As mentioned earlier, the data elements that are generated by a function call fill up the event specific data portion of the event records. By using the function calls stated above as one example of the present invention, application programming interface 18 generates event records that contain information relating to the domains used by each subscriber in the system. When an event record is generated, application programming interface 18 sends the event record to the online teleprocessing gateway 20.

Figure 3A:
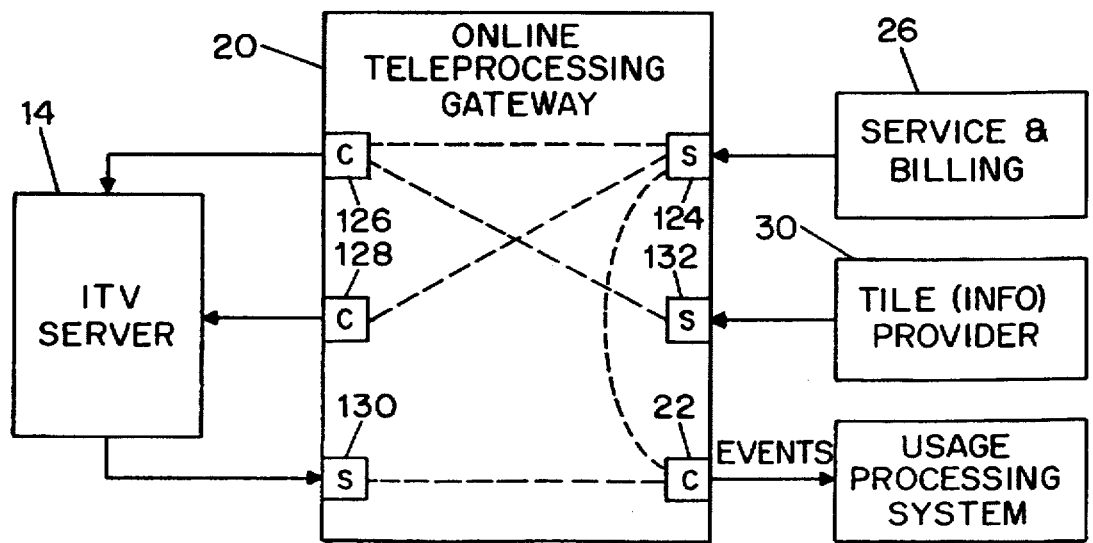
FIG. 3a is a block diagram illustrating an embodiment of an online teleprocessing gateway in accordance with the present invention.

FIG. 3a illustrates an embodiment of an online teleprocessing gateway 20, in accordance with the invention, having various TCP client and server sockets. The online teleprocessing gateway 20 acts as an interactive television transaction gateway. Each transaction is defined as any application level data set or record that needs to be transmitted between external entities and the interactive television server 14. These external entities may include a usage processing system 40, customer service and billing processor 26 and information providers 30, as illustrated in FIG. 3a. Sockets 124, 130, and 132 of the online teleprocessing gateway 20 are TCP Server sockets. Sockets 22, 126 and 128 are TCP Client sockets. Customer service and billing server 26 sends administrative data to socket 124 of online teleprocessing gateway 20. This information in turn is reformatted and prepared for transmission to interactive television server 14. Furthermore, socket 130 receives event records from interactive television server 14 and prepares the record for transmission to usage processing system 40 via TCP client socket 22.

Figure 3B:
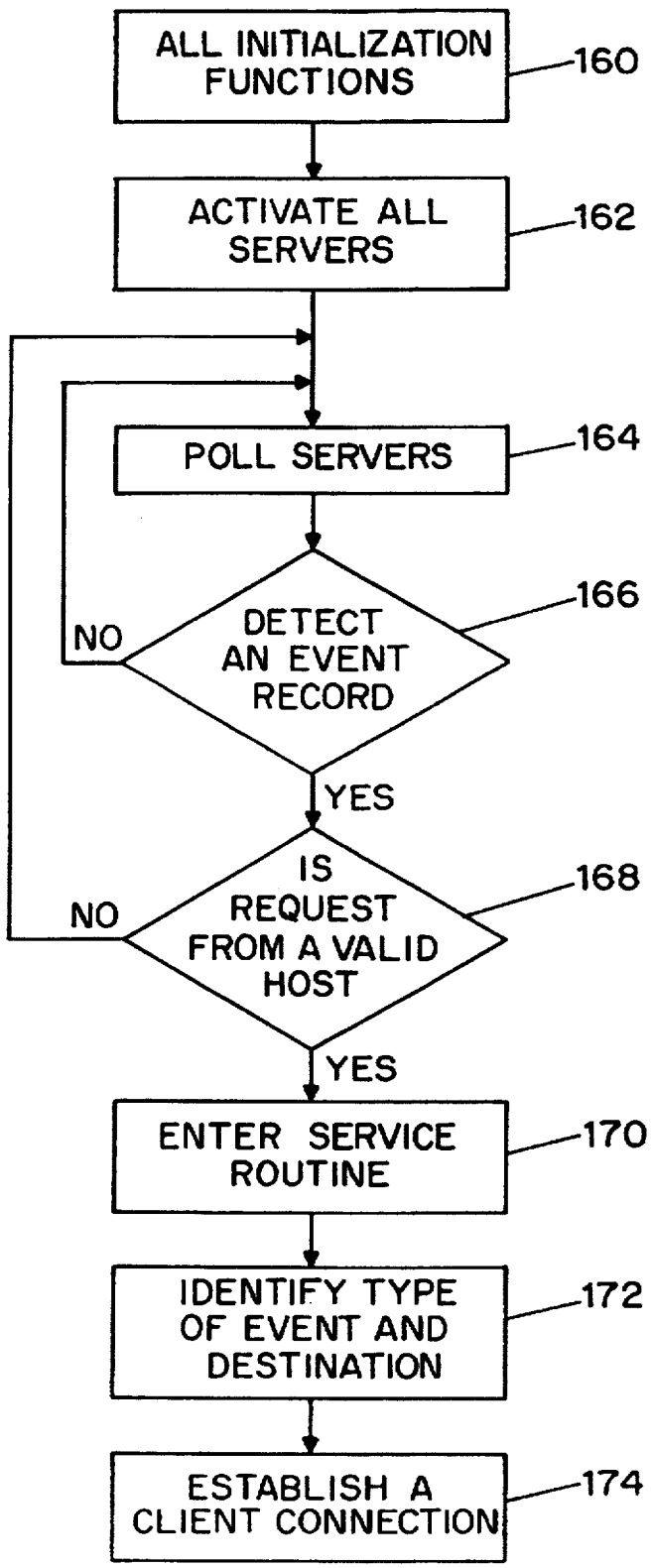

FIG. 3b is a flowchart illustrating the operation of online teleprocessing gateway 20. At step 160, the system enters initialization mode by calling initialization functions. The initialization functions are responsible for reading all the configuration files stored in connection with the operation of gateway 20. These initialization functions also initialize all the tables stored in gateway 20. At step 162, the system sets up multiple listening ports or sockets based on the number of external entities that intend to communicate with online teleprocessing gateway 20. Typically there are one or two ports or sockets per entity. Each port is driven by a separate application server within the gateway 20.

Gateway 20 functions as what is known in the art as a "server daemon." Server Daemons are well known in the art and defined in *Unix Network Programming* by W. Richard Stevens (Prentice Hall, 1990). Basically, a daemon is a process that executes in the background either waiting for some event to occur, or waiting to perform some specified task on a periodic basis. Typically, in one embodiment of the invention, a daemon may be a UNIX process, which controls application-level data communications for a multi-media server such as media server 16. The scope of the daemon extends to clients who can get connection to one of the mentioned servers and could have their transaction routed to a specific destination. Online teleprocessing gateway 20 includes a dedicated management information base (MIB) that contains communications information on each entity coupled to online teleprocessing gateway 20. A plurality of monitoring processes or hooks known as simple network management protocol (SNMP) use information contained in MIB to monitor the communication status of each connected entity. SNMP hooks are installed in a single entity. It can be appreciated that multiple servers can also be used. This approach will lead to multiple MIBs and SNMP hooks in each server.

As mentioned, gateway 20 directs every transaction that it receives to a predetermined location. Therefore, at step 162, gateway 20 also establishes client connections to the destination server. These client connections are typically raw socket based TCP/IP clients. Gateway 20 also sets up a Sybase open-client connection to interactive television server 14 via TCP client server socket 128, for sending, information that updates Sybase database 15 in interactive television server 14.

At step 164 the system enters a continuous loop waiting for the occurrence of events. Gateway 20 polls all the TCP server sockets or ports. At step 166 gateway 20 determines whether an event has been sent by an outside entity. If so, at step 168 the system determines whether the information received from the outside entity is valid. This is to make sure that only authorized users are allowed access into gateway 20. At step 170 the system enters a service routine. It also goes back to step 164 to poll sockets for incoming signals. Meanwhile, the server assigned to the port or socket that has received an event record begins execution. At step 172 each server that is prompted to act, identifies the type of event and the destination of the record. Thereafter the servers establish a client connection with the intended destination at step 174.

The usage processing system 40 of FIG. 1 is described in more detail with reference to FIG. 4. The TCP Server socket 48 receives event records from online teleprocessing gateway 20, and sends these records to usage scheduler 42. Scheduler 42 is used to transport usage records to usage application servers 44. In one embodiment of the invention, six usage application servers run concurrently. Usage processing system 40 is based on a UNIX system according to one embodiment of the invention. The event records received at TCP server socket 48 are written to one end of a UNIX FIFO, while usage scheduler 42 reads the data from the other end. For each event record, usage scheduler 42 locates the corresponding subscriber account number from a reference table stored at usage processing database 46. The scheduler 42 then routes the event record to the next available usage application server 44. Each usage application server 44 processes the event record and calculates the usage for each domain contained in the event record, and records the events, their time of occurrence, and the usage duration for each domain in the usage processing system's database 46. The usage duration of each domain may span over few consecutive events. Database 46 stores the aggregate time a usage domain spans over a consecutive sequence of events.

Figure 4:
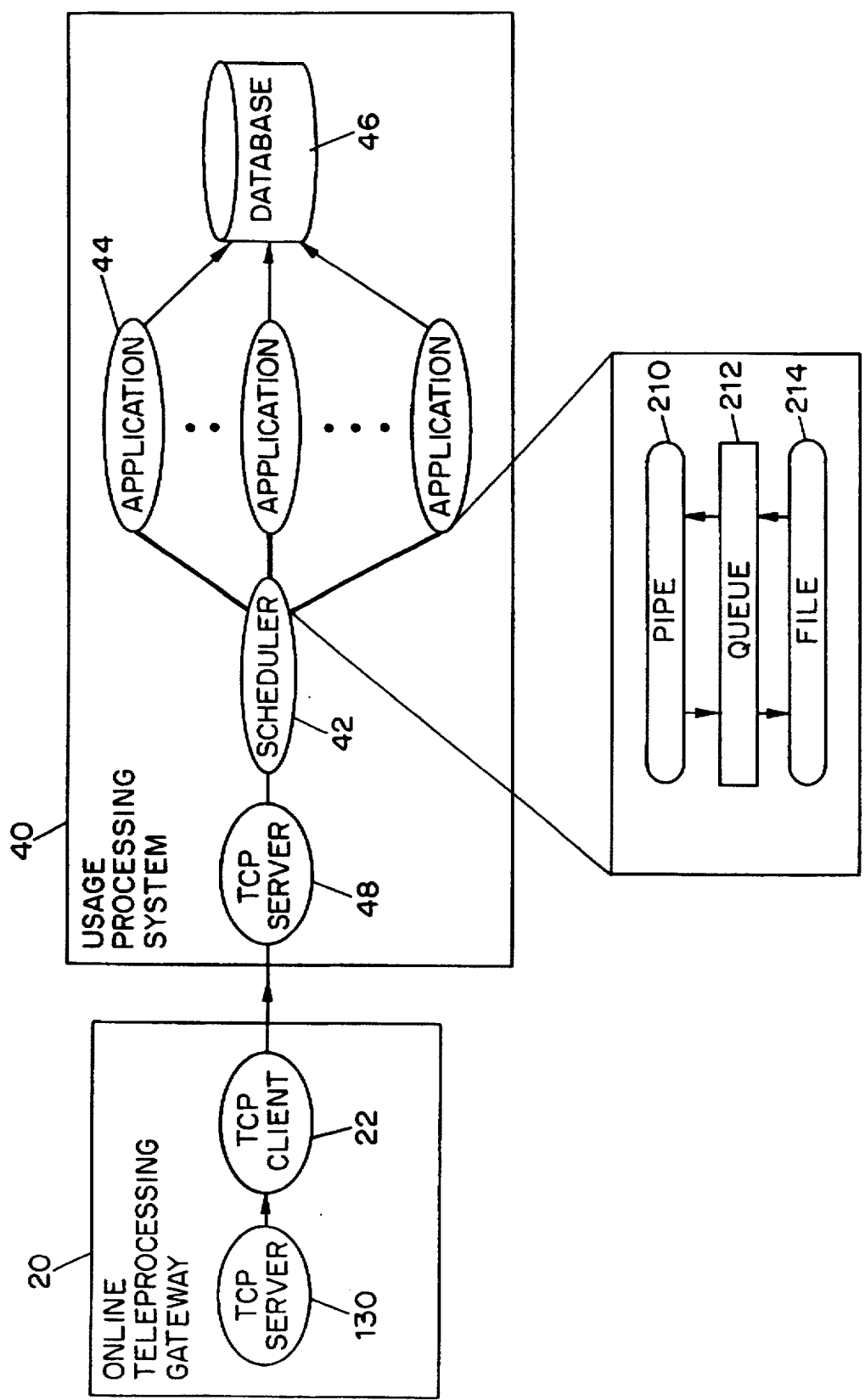
FIG. 4 is a block diagram of an embodiment of a usage processing system according to the invention.

FIG. 4 illustrates a set of three alternative communication channels between a scheduler and an application server such as a "pipe" 210, a "queue" 212 and a "file" 214 associated with each node. Each pipe 21 may be a communication channel used to transport data files from usage scheduler to its associated usage application server 44 in real time. The system also sets a queue buffer 212, whose purpose is to temporary store the data files in case the corresponding pipe 210 is full. The system also sets a file storage 214, whose purpose is to temporary store the data files in case the corresponding queue buffer 212 is full. During operation, if a pipe is ready, i.e not full, it will receive the data files from the usage scheduler 42 to pass it to the appropriate usage application server 44. On the other hand, if the pipe 210 is full, the data will be put into its queue temporarily until either the pipe is ready or the queue is full. If the pipe 210 is ready, the data in the queue will be put back in the pipe. If the queue is full, the data from the usage scheduler 42 will be stored into the corresponding file storage 214, until the queue is ready. If the queue is ready, the data in the file storage 214 will is retrieved back into the queue. The whole process will continue as long as usage scheduler 42 and usage application servers 44 are running.

Figure 5:
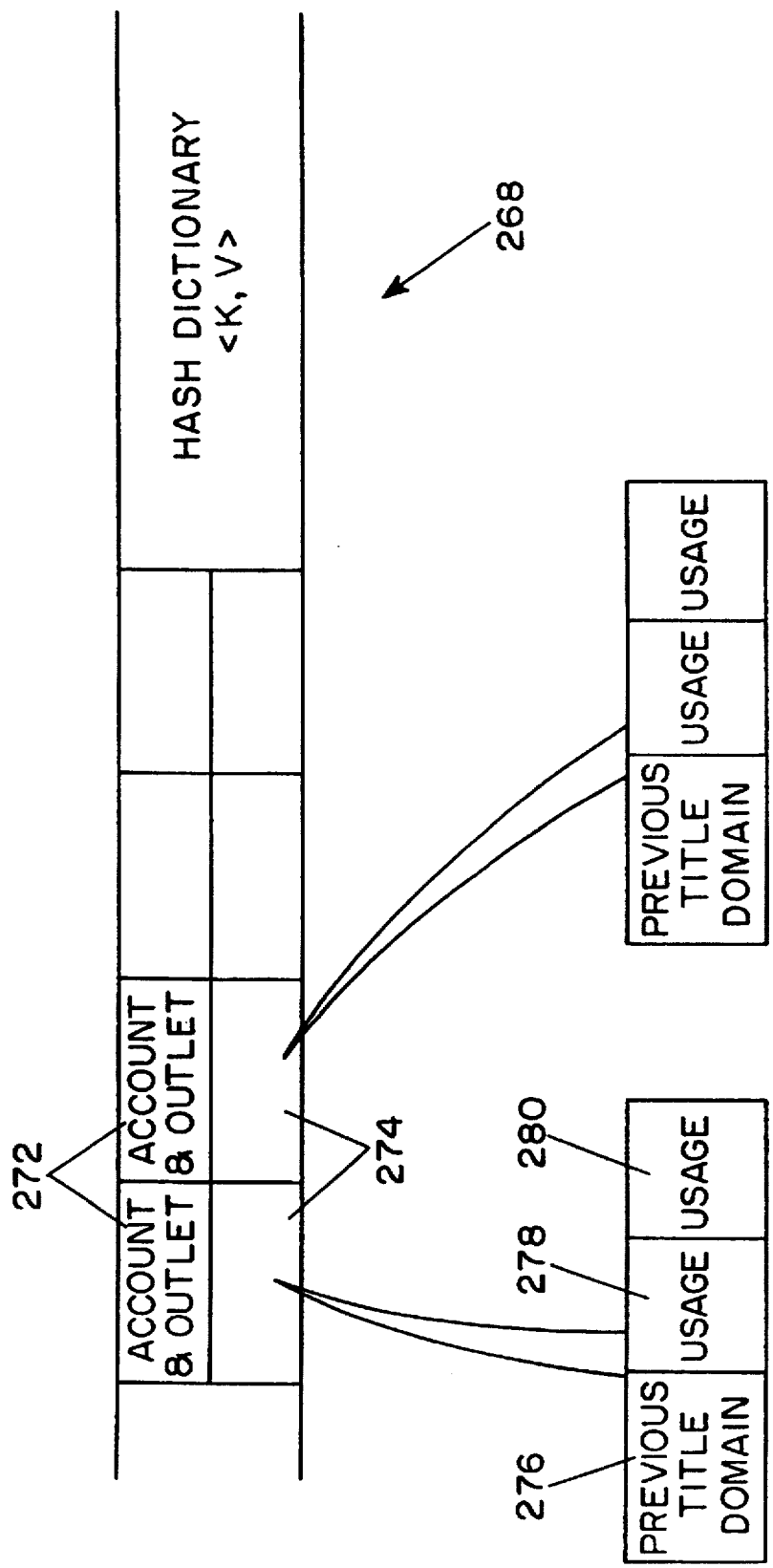
FIG. 5 is a block diagram of an embodiment of a memory management structure of each application server in the usage processing system in accordance with the invention.

Referring now to FIG. 5, a memory management structure 268 used by each of application servers 44, according to one embodiment of the present invention, is described. Memory management structure 268 is an object memory management structure, configured as a hash dictionary containing keys 272 and values 274. The system uses an efficient hashing function to search for a value associated with a given key. In one embodiment of the invention, the key is the concatenation of account and outlet, as explained in reference to standard record element portion of an event record. The value is a value structure containing previous title portion 276, a pointer 278 referring to session usage and a pointer 280 referring to a plurality of usage domains related to a specific account and outlet number. Object memory management 268 is a dynamic structure that shrinks and expands depending upon the number of active interactive television sessions and the corresponding domains.

When an event is processed by an application server 44, the account and outlet number corresponding to that event is identified. Object memory management structure 268, looks for the values corresponding to the account and outlet number. Domain pointers in object memory management structure 268 refer to a list of usage domains that are currently being tracked by the usage processing system 40. The domains in the event being currently processed are compared with the domains previously being tracked. For those domains that remain open, the application server 44 aggregates the domain usage. For those domains that are not present in the current event being processed, but were previously present in prior events, the system drops the pointer to those domains, and the aggregate domain usage is stored.

Figure 6A:
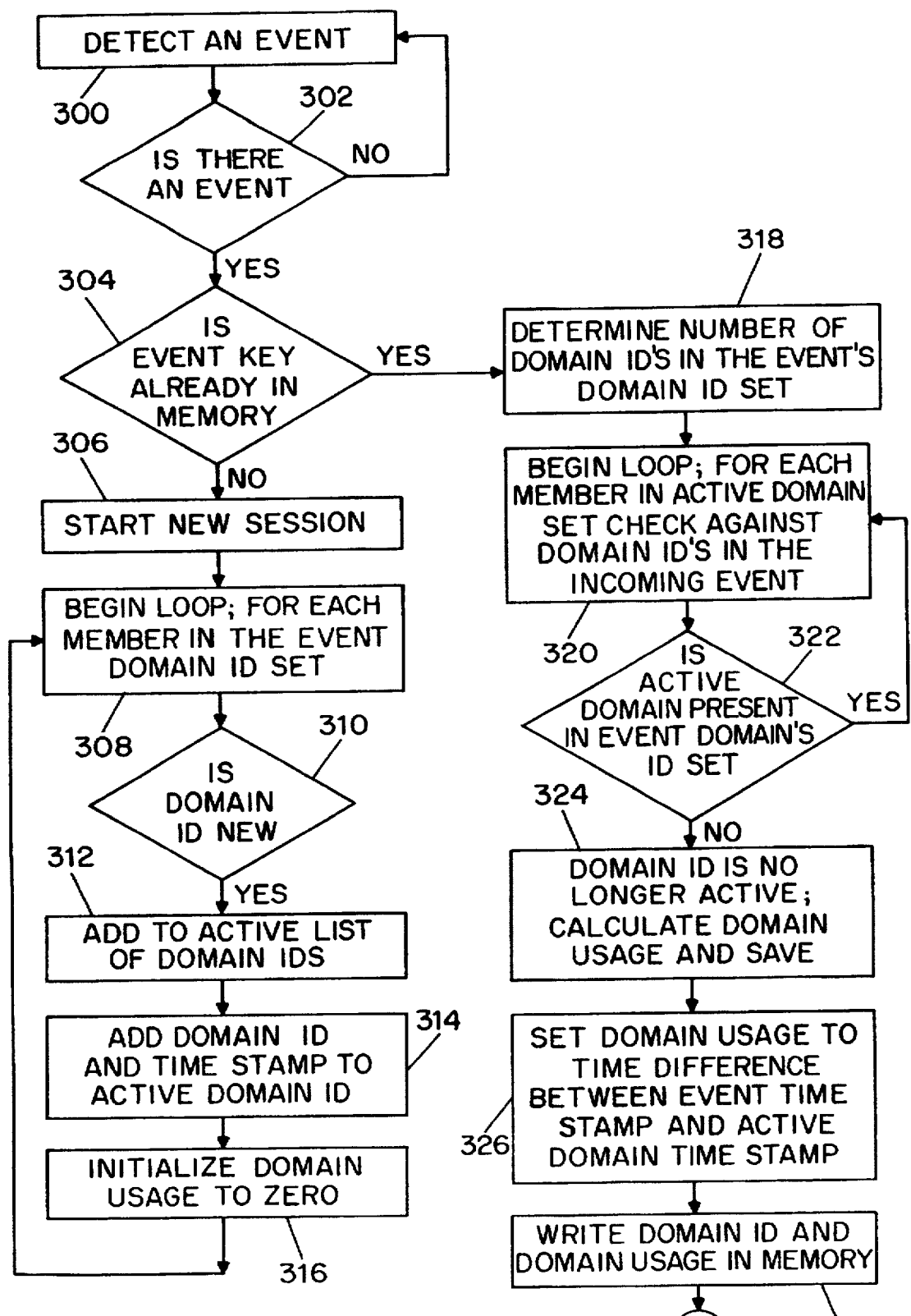
FIG. 6, including FIGS. 6a and 6b a flow chart illustrating a process for calculating usage in accordance with one embodiment of the invention.

FIG. 6a is a flowchart illustrating the operation of the usage processing system in accordance with one embodiment of the present invention. At steps 300 and 302 respectively, the system enters a continuous loop to detect the occurrence of an event. If the occurrence of an event is detected, the system goes to step 304 to determine whether the event key is already present in memory. If not, the system goes to step 306 to start a new session for that particular event. At step 308, the system checks each domain ID in the event's domain ID set. At step 310, the system determines whether a particular domain ID checked is new. If so, the system goes to step 312, and adds the particular domain ID checked to an active list of all domain ID's. At step 314, the system adds a corresponding time stamp to the new domain ID that is added to the domain ID active list. At step 316, the system initializes the domain usage for the new domain ID to zero. The system goes back to step 308 to check the next domain ID in the event's domain ID set.

Figure 6B:
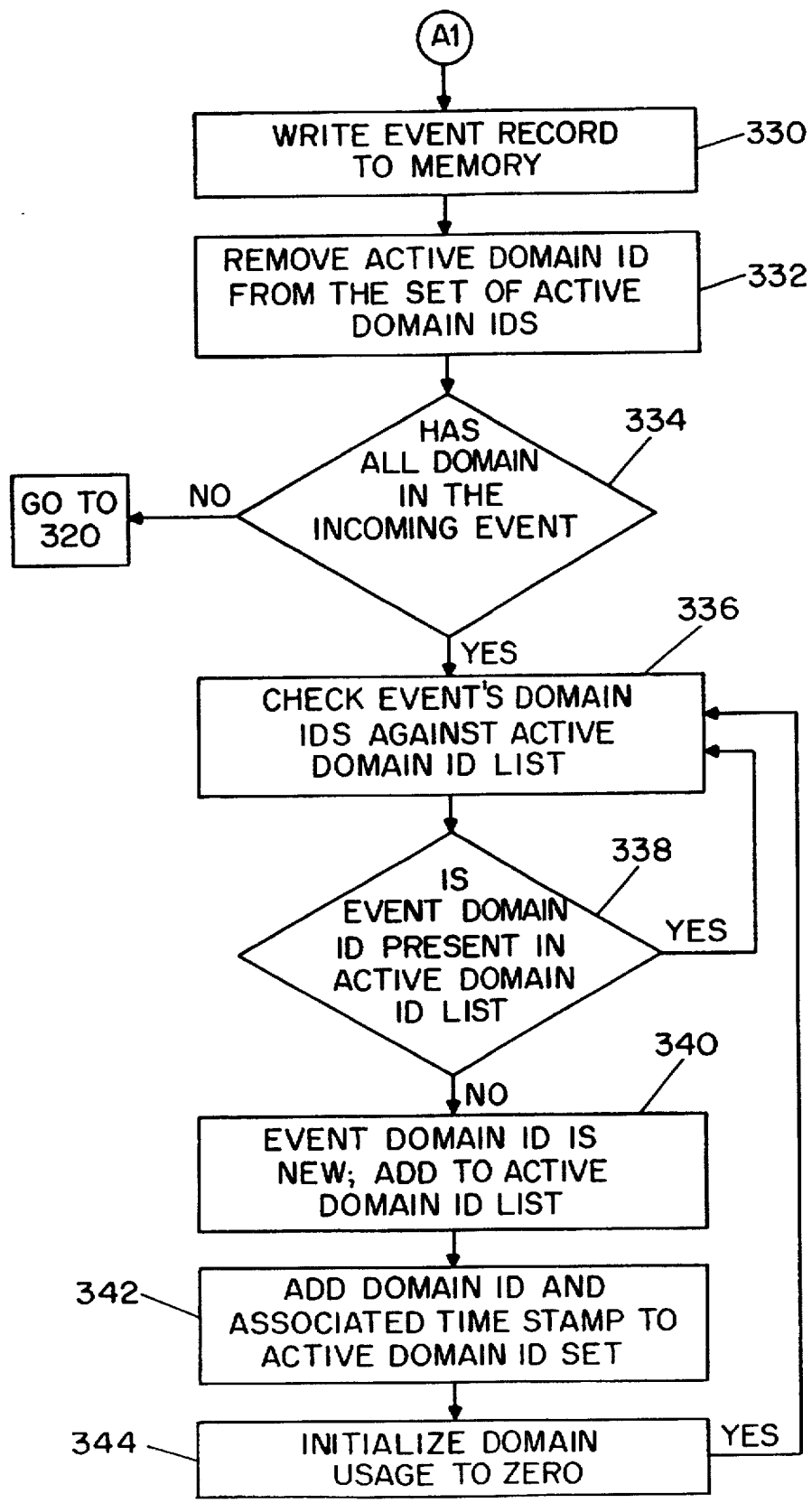

If however, at step 304, the system determines that the incoming event key was already present in the memory, the system goes to step 318, to determine the number of domain Ids in the event domain ID set. The system then goes to step 320, and inspects active domain ID's stored in an active domain ID list against the domain ID's in the incoming event. At step 332 for each active domain in the active domain ID list, the system determines whether a corresponding domain ID is present in the event's domain ID set. If not, the domain ID is no longer active. The system goes to step 324 and calculates and saves the domain usage. At step 326, the system sets the domain usage to the time difference between event time stamp and the active domain time stamp. At step 328, the system writes in the memory the domain ID and its corresponding usage. Referring to FIG. 6b, at step 338 the system writes the event record in the memory. At step 332, the system removes the active domain ID from the active domain ID's list. At step 334, the system determines whether all active domain ID's in the active domain ID's list have been checked against domain ID's in the incoming event's domain ID list. If not, the system goes to step 320. Otherwise, the system goes to step 336 and for each member of event's domain ID set, it checks active domain ID list. At step 338, the system determines whether an event's domain ID is present in the active domain ID list. If not, the event's domain ID is new. The system goes to step 340 and adds the event's domain ID to the active domain ID list. At step 342, the system adds the corresponding time stamp for the new active domain ID. At step 344, the system initializes the usage for the new active domain ID to zero. Thus, the system begins tracking a new domain ID. In another embodiment in accordance with the present invention, each domain id may also include a "start" and "stop" flag. Thus when a domain ID becomes active, the "start" flag indicates the time of occurrence of this domain ID. The domain ID remains active in subsequent events. However, these subsequent events may not contain the domain ID. The system begins a timer to measure the time of occurrence of the domain ID and awaits the next event record that contains the domain ID again with a "stop" flag. When the domain ID becomes inactive, the event record corresponding to this deactivation, may carry the domain ID again with a "stop" flag. This enables the system to also measure the duration of the domain ID.

The usage processing system 40 is also coupled to a usage reporter 50, which reports usage by number of times a particular interactive television title or channel is accessed and the total duration the title or channel was accessed. Database 46 includes a server that functions as a data analyzer to analyze its content in response to specified reports required by usage reporter 50. For example, usage reporter 50 may also report the total usage of a domain within a given period of time. Usage reporter 50 also may report the number of times a domain was accessed within a given period of time. It may also tracks the navigation path of a given domain within a given period of time. For example, the reporter 50 generates a report about the number of accesses to a given domain from each of other domains at a specific time. This provides the title developers and the marketing personnel with information about the use of each title and domains within that title.

Thus a usage management system in accordance with the present invention provides a convenient and efficient arrangement for monitoring usage information and particularly tracking usage and behavior of subscribers in an interactive television network or users on a computer network. This information may be used by information and title providers to customize their application based on a substantially accurate and responsive feedback.

As a result, the usage management system of the present invention allows title providers to determine the best marketing mix for product, promotion, price, and place, that will best sell interactive television services and stimulate usage. Furthermore, the usage management system provides an identification and understanding of the segmentation dynamics in the interactive television marketplace. Furthermore, advertisers may be able to determine the response to their advertising messages at various times, and thus, decide on the best time to broadcast their advertising messages.

While only certain features of the invention have been illustrated and described herein, many modifications, substitutions, changes or equivalents will now occur to those skilled in the art. It is therefore, to be understood that the appended claims are intended to cover all such modifications and changes as fall within the true spirit of the invention.

We claim:

1. In a usage management system for tracking a sequence of events generated by a plurality of applications in response to usage activities of users of an interactive system, a usage processing system, comprising:

a usage application server adapted to receive a plurality of event records generated in response to said usage activities of said users of said interactive system, said application server further adapted to track the time of occurrence of each one of said generated events, wherein said event records contain at least one domain identification, each domain representing a logical location corresponding to an application, and said usage application server tracking the time of occurrence of each domain; and a database coupled to said usage application server adapted to store data corresponding to an identity of said generated events and corresponding times of occurrence.

2. The usage processing system in accordance with claim 1, wherein said usage application server measures the duration of each domain remaining active for a sequence of event records.

3. The usage processing system in accordance with claim 2, wherein said sequence of event records are consecutive.

4. The usage processing system in accordance with claim 3, wherein said database is adapted to further comprise a data analyzer so as to measure information corresponding to each domain remaining active within a predefined period of time.

5. The usage processing system in accordance with claim 4, wherein said data analyzer measures the aggregate of time wherein a domain has remained active, within a predefined period of time.

6. The usage processing system in accordance with claim 5, wherein said information comprise the number of occurrences of each domain.

7. The usage processing system in accordance with claim 6, wherein said database further stores demographic characteristics of said users so as to correlate information corresponding to each domain activated within a predetermined period of time to said demographic characteristics.

8. A usage management system for tracking usage of applications available to users of an interactive network, comprising:

an application server adapted to process a plurality of applications on demand by said users, said application server generating a plurality of event records, each event record comprising at least one active domain identifier representing a domain being executed, wherein each domain represents a logical location within an application;

a usage processing server coupled to said application server, said usage processing server adapted to receive signals from said application server corresponding to said generated event records, said usage processing server further adapted to track the time of occurrence of each domain identified in each event record;

a storage device coupled to said usage processing server for storing data representing said time of occurrence of each active domain; and a data analyzer adapted to measure the number of occurrences of each domain at a predefined time.

9. The usage management system in accordance with claim 8, wherein said applications comprise titles generated for interactive television systems.

10. The usage management system in accordance with claim 1 wherein, said usage processing server measures the duration of each domain remaining active over a sequence of events.

11. The usage management system in accordance with claim 10 wherein, said sequence of events is consecutive.

12. The usage management system in accordance with claim 11, wherein said storage device further stores demographic characteristics of each one of said users so as to correlate information corresponding to each domain activated within a predetermined period of time to said demographic characteristics.

13. The usage management system in accordance with claim 12, further comprising a teleprocessing gateway server for providing a communication channel between said application server and said usage processing server.

14. The usage management system in accordance with claim 13, wherein each event is generated when an application executes a different domain.

15. A method for tracking usage activity for applications available to users of an interactive network, comprising:

receiving a plurality of event records generated in response to said usage activity of said users of said interactive network, each event record comprising at least a domain identifier associated with an active domain, said domain representing an executable logical location within an application;

tracking the time of occurrence of each said active domain;

storing data corresponding to an identity of said active domain and corresponding time of occurrence; and measuring the duration of each domain remaining active for a consecutive sequence of event records.

16. The method for tracking usage activity in accordance with claim 15, further comprising the step of measuring the number of occurrences of each domain at a predefined time.

17. The method for tracking usage activity in accordance with claim 16, further comprising the step of storing demographic characteristics of each user of said applications.

18. The method for tracking usage activity in accordance with claim 17, further comprising the step of generating each event record upon execution of a new domain.

19. The method for tracking usage activity in accordance with claim 15, wherein said interactive network is an interactive television system.

20. The method for tracking usage activity in accordance with claim 18, wherein said interactive network is an interactive television system.

21. A method for tracking usage activity for applications available to users of an interactive network, comprising:

receiving a plurality of event records generated in response to said usage activity of said users of said interactive network, each event record comprising at least a domain identifier associated with an active domain, said domain representing an executable logical location within an application;

tracking the time of occurrence of each said active domain;

storing data corresponding to an identity of said active domain and corresponding time of occurrence; and measuring the number of occurrences of each domain at a predefined time.

22. The method for tracking usage activity in accordance with claim 21, wherein said interactive network is an interactive television system.

* * * * *